J. F. HOFFMAN.
COOLING LIQUID SUPPLY VALVE FOR REFRIGERATOR PLANTS.
APPLICATION FILED MAR. 29, 1915.
1,150,518.
Patented Aug. 17, 1915.
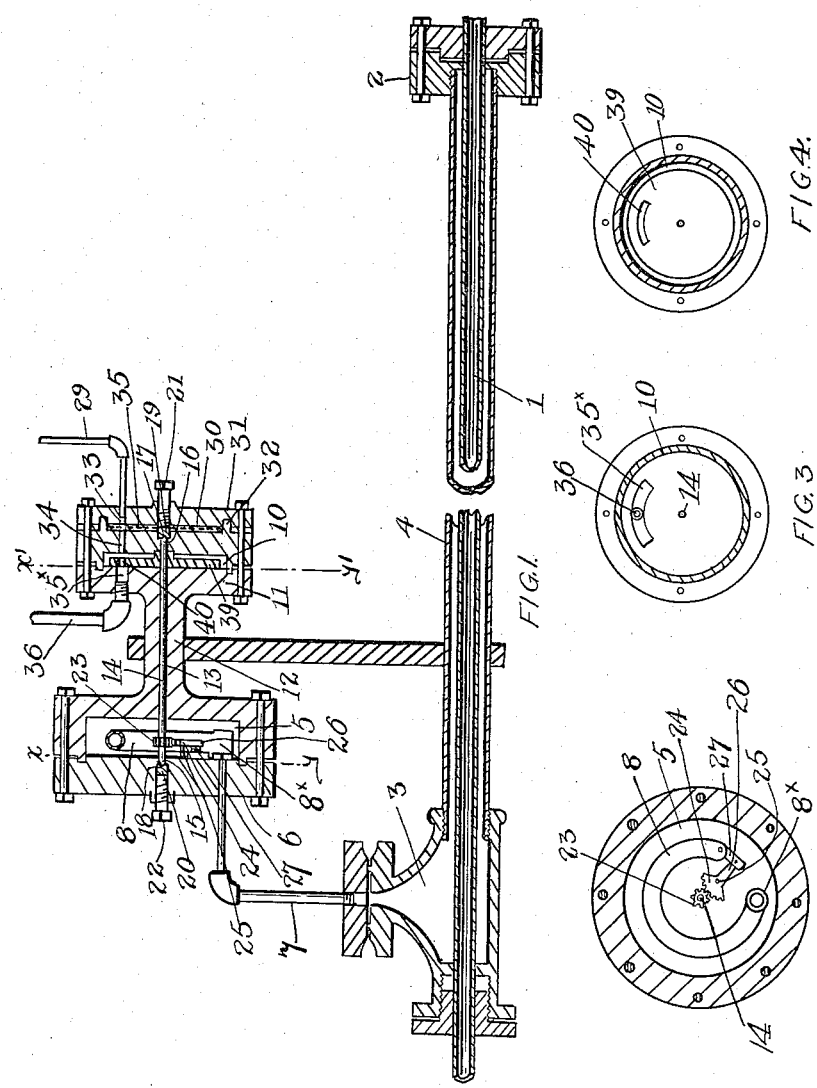
WITNESSES.
INVENTOR.
JOHN. F. HOFFMAN

UNITED STATES PATENT OFFICE.

JOHN FREDERICK HOFFMAN, OF TORONTO, ONTARIO, CANADA.

COOLING-LIQUID-SUPPLY VALVE FOR REFRIGERATOR PLANTS.

1,150,518.  Specification of Letters Patent.  Patented Aug. 17, 1915.

Application filed March 29, 1915. Serial No. 17,709.

*To all whom it may concern:*

Be it known that I, JOHN FREDERICK HOFFMAN, of the city of Toronto, in the county of York, in the Province of Ontario, Canada, have invented certain new and useful Improvements in Cooling-Liquid-Supply Valves for Refrigerator Plants, of which the following is the specification.

My invention relates to improvements in cooling liquid supply valves for refrigerator plants particularly adapted for supplying cooling liquid to a refrigerator plant and the object of the invention is to devise a valve which will automatically supply such liquid to the plant in proportion to the varying needs of the plant and it consists essentially of a chamber filled with an expansive fluid such as ammonia, a gage coil connected to the chamber, a hot gas discharge pipe passing through the expansion chamber, a supply pipe for supplying liquid to the plant, and a valve operated by the expansion of the gage spring to control the flow of fluid through the supply pipe to the plant as hereinafter more particularly explained by the following specification.

Figure 1, is a sectional view of my device. Fig. 2, is a cross sectional view on line $x$—$y$ Fig. 1. Fig. 3, is a cross sectional view on line $x'$—$y'$ Fig. 1, looking toward the left. Fig. 4, is a sectional view also on line $x'$—$y'$ Fig. 1 looking toward the right.

In the drawings like letters of reference indicate corresponding parts in each figure.

1 indicates the discharge pipe for carrying off the hot gases from the refrigerating plant.

2 indicates a bearing member through which the pipe 1 passes.

3 indicates an expansion chamber surrounding the pipe 1.

4 indicates a tubular extension to the expansion chamber 3, such tubular extension being preferably threaded and screwed into the expansion chamber 3 at one end and also provided at the opposite end with a threaded portion screwed into the bearing 2.

5 indicates a gage spring chamber.

6 indicates the cover of the gage spring chamber and 7 a pipe leading from the expansion chamber 3 to the interior of the gage spring chamber 5.

8 indicates a tubular gage spring of that type commonly employed in pressure indicators. The inner end of the pipe 7 leading into the gage spring chamber 5 is connected to the end of the gage spring indicated by the numeral 8× in order to feed the expansive fluid into the interior of the spring.

10 indicates the valve chamber.

11 indicates the cover of the valve chamber.

12 indicates a portion connecting the cover 11 to the body of the gage spring chamber 5.

13 indicates an orifice extending through the portion 12.

14 indicates a rocking rod extending through the orifice 13, such rod being preferably provided with pointed ends 15 and 16 held in bearing recesses 17 and 18 formed in the blocks 19 and 20 which are adjustably held in position by set screws 21 and 22.

23 indicates a pinion secured to the rocking shaft 14.

24 indicates a quadrant pivoted at 25 and provided with an arm 26.

27 indicates a link pivotally secured at one end to the arm 26 and at the opposite end to the free end of the gage spring 8.

29 indicates a liquid supply pipe which extends from a suitable source of supply.

30 indicates a chamber formed by the portion 31 and the tongue and groove connection 32.

33 indicates an orifice opening into the chamber 30 and in which the inner end of the pipe 29 is secured.

34 is an orifice extending between the chamber 30 and the valve chamber 10.

35 indicates a gauze strainer which is inserted in the chamber 30 in the position indicated in Fig. 1 so that the liquid passes therethrough on its way from the orifice 33 to the orifice 34 so as to strain the same.

35× indicates an arc-shaped port formed in the opposite wall of the chamber 10.

36 indicates a pipe leading from the port 35× to the expansion coils of the refrigerator plant.

39 indicates a disk valve secured to the shaft 14 and provided with an arc-shaped port 40.

The expansion chamber 3 and pipe 4 are filled with a suitable fluid such as ammonia which will readily expand under the influence of the hot gases passing through the pipe 1.

Having described the principal parts involved in my invention I will briefly describe the operation of the same.

As the gases passing through the outlet pipe 1 rise in temperature the fluid in the pipe 4 and chamber 3 expands and passes through the pipe 7 into the gage spring 8. The gage spring 8 then expands rocking the shaft 14 in a circumferential direction so as to close the port. It will be readily understood that the hotter the gas is when it passes through the pipe 1 the greater the expansion will take place of the fluid contained in the tube 4 and expansion chamber 3 and therefore the greater will be the expansion of the gage spring 8 thereby turning the disk valve 39 to a greater degree and opening the ports 40 and 35 to a greater extent so as to allow a greater amount of liquid to pass therethrough.

From this description it will be seen that I have devised a very simple device which will automatically supply a cooling liquid to the refrigerator in such a way that the amount supplied will always be equal to the requirements of the plant at all times and under all conditions.

What I claim as my invention is—

In a device of the class described, a hot gas discharge pipe, a fluid bearing pipe surrounding said discharge pipe, an expansion fitting carried by said fluid bearing pipe also surrounding said discharge pipe, a liquid intake controlling disk valve having a port opening extending therethrough, a liquid tight casing for the valve having alined ports in the walls thereof on each side of the disk valve and in the circumferential path of the port opening of the disk valve, a liquid supply pipe leading to one port of the casing and a liquid supply pipe leading from the other port of the casing, and means interposed between said expansion fitting and said valve for automatically turning said disk valve so as to carry the port opening into or out of alinement with the ports of the casing operated by a change of temperature in the liquid flowing from said expansion fitting.

In testimony whereof I have hereunto set my hands in the presence of two witnesses.

JOHN FREDERICK HOFFMAN.

Witnesses:
E. PENNOCK,
M. EGAN.

Copies of this patent may be obtained for five cents each, by addressing the "Commissioner of Patents, Washington, D. C."